United States Patent
Zhang et al.

(10) Patent No.: US 9,475,396 B2
(45) Date of Patent: Oct. 25, 2016

(54) SLIP CONTROL DEVICE FOR ELECTRIC VEHICLE

(71) Applicants: Yingjie Zhang, Iwata (JP); Junichi Hirata, Iwata (JP)

(72) Inventors: Yingjie Zhang, Iwata (JP); Junichi Hirata, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/950,872

(22) Filed: Nov. 24, 2015

(65) Prior Publication Data
US 2016/0075237 A1    Mar. 17, 2016

Related U.S. Application Data

(63) Continuation of application No. PCT/JP2014/063886, filed on May 26, 2014.

(30) Foreign Application Priority Data

Jun. 3, 2013    (JP) ................. 2013-116725

(51) Int. Cl.
  *B60L 9/00* (2006.01)
  *B60L 11/00* (2006.01)
  (Continued)

(52) U.S. Cl.
  CPC ............... *B60L 3/106* (2013.01); *B60K 28/16* (2013.01); *B60L 3/102* (2013.01); *B60L 3/12* (2013.01); *B60L 15/20* (2013.01); *B60L 15/2009* (2013.01); *B60L 15/2072* (2013.01); *B60L 2220/42* (2013.01); *B60L 2220/44* (2013.01); *B60L 2240/421* (2013.01); *B60L 2240/423* (2013.01); *B60L 2260/44* (2013.01);
  (Continued)

(58) Field of Classification Search
  CPC .................................................... B60K 28/16
  See application file for complete search history.

(56) References Cited

U.S. PATENT DOCUMENTS

| 4,860,847 A | 8/1989 | Shiraishi et al. |
| 7,392,875 B2 | 7/2008 | Matsuzaki |

(Continued)

FOREIGN PATENT DOCUMENTS

| JP | 63-259141 | 10/1988 |
| JP | 2-299402 | 12/1990 |

(Continued)

OTHER PUBLICATIONS

International Search Report mailed Aug. 12, 2014, in corresponding International Application No. PCT/JP2014/063886.

(Continued)

*Primary Examiner* — Imran Mustafa (57) ABSTRACT

A slip control device for an electric vehicle which determines without error slippage occurrence with only a rotation angle sensor for motor rotation control and perform rapid control to eliminate the slippage. A threshold calculator calculates a normal angular acceleration of a motor depending on a manipulation amount of an accelerator to obtain a threshold, and an angular acceleration calculator differentiates a detection value from a rotation angle sensor twice to calculate an angular acceleration. A slip determination determines whether a wheel driven by a motor has slipped, and a torque limitation limits a torque when determining a slippage. The determination compares the calculated acceleration to the threshold, counts a number of times it is consecutively determined that the calculated acceleration exceeds the threshold, and determines a slippage if the number of times has reached a set value.

8 Claims, 4 Drawing Sheets

(51) Int. Cl.
- *G05D 1/00* (2006.01)
- *G05D 3/00* (2006.01)
- *G06F 7/00* (2006.01)
- *G06F 17/00* (2006.01)
- *B60L 3/10* (2006.01)
- *B60L 15/20* (2006.01)
- *B60L 3/12* (2006.01)
- *B60K 28/16* (2006.01)

(52) U.S. Cl.
CPC ...... *B60W 2510/082* (2013.01); *Y02T 10/645* (2013.01); *Y02T 10/648* (2013.01); *Y02T 10/7275* (2013.01)

(56) References Cited

U.S. PATENT DOCUMENTS

| | | | |
|---|---|---|---|
| 7,451,847 B2 | 11/2008 | Hommi | |
| 2005/0150702 A1* | 7/2005 | Matsuzaki | B60K 6/52 180/197 |
| 2005/0274560 A1* | 12/2005 | Wakao | B60L 3/102 180/197 |
| 2005/0284679 A1* | 12/2005 | Hommi | B60K 6/445 180/197 |
| 2006/0066270 A1 | 3/2006 | Kumagai et al. | |
| 2006/0185914 A1* | 8/2006 | Hommi | B60K 6/365 180/65.1 |
| 2014/0330470 A1 | 11/2014 | Ozaki et al. | |

FOREIGN PATENT DOCUMENTS

| | | |
|---|---|---|
| JP | 8-182119 | 7/1996 |
| JP | 2005-47313 | 2/2005 |
| JP | 2005-186756 | 7/2005 |
| JP | 2006-94594 | 4/2006 |
| JP | 2011-105072 | 6/2011 |
| JP | 2012-121447 | 6/2012 |
| WO | WO 2013/077409 A1 | 5/2013 |

OTHER PUBLICATIONS

U.S. Appl. No. 14/951,029, filed Nov. 24, 2015, Yingjie Zhang et al., NTN Corporation, Osaka, Japan.

PCT International Preliminary Report on Patentability dated Dec. 17, 2015 in corresponding International Patent Application No. PCT/JP2014/063886.

* cited by examiner

SLIP CONTROL DEVICE FOR ELECTRIC VEHICLE

CROSS REFERENCE TO THE RELATED APPLICATION

This application is a continuation application, under 35 U.S.C. §111(a), of international application No. PCT/JP2014/063886, filed May 26, 2014, which claims Convention priority to Japanese patent application No. 2013-116725, filed Jun. 3, 2013. The entire disclosures of the above application(s) are herein incorporated by reference as a part of this application.

BACKGROUND OF THE INVENTION

1. Field of the Invention

The present invention relates to a slip control device which is provided in an electric automobile such as a vehicle running by drive of only a motor or a vehicle including both a motor and an engine, and which performs torque control when a slippage occurs during running with the motor, to eliminate the slippage.

2. Description of Related Art

In order to prevent acceleration from being stopped due to a slippage of a drive wheel caused by an excessive driving torque during acceleration of a vehicle, a traction control device for the vehicle is generally known to detect the slip amount of the drive wheel and limits engine output or a wheel braking force such that the slip amount of the drive wheel reaches a target slip amount for the frictional coefficient of a road surface (e.g., Patent Document 1). In particular, the traction control device controls the slip amount by decreasing the engine output or increasing the braking force.

Patent Document 2 proposes that, if a value of angular acceleration of a drive wheel exceeds an angular acceleration threshold, feedback correction is performed on a torque command by using a torque command correction value ΔTr including an item obtained by multiplying the angular acceleration by a feedback gain. Specifically, grip of the drive wheel on a road surface is detected by comparing the angular acceleration and the angular acceleration threshold. In addition, after the drive wheel returns from the slippery road surface to a normal road surface, a temporary decrease in the angular acceleration is detected by comparing the angular acceleration and another angular acceleration threshold. The values of the angular acceleration threshold and the feedback gain are set in accordance with an accelerator position and the wheel speed of the drive wheel. Moreover, a value of coefficient used in determining the angular acceleration threshold and the feedback gain is changed on the basis of whether a rotation frequency of a motor unit exceeds a base rotation frequency.

RELATED DOCUMENT

Patent Document

[Patent Document 1] JP Laid-open Patent Publication No. S63-259141

[Patent Document 2] JP Laid-open Patent Publication No. H8-182119

SUMMARY OF THE INVENTION

In the technique disclosed in Patent Document 1, the rotation speed of the drive wheel and the rotation speed of a driven wheel are required in order to calculate a slip amount. Thus, in a left/right-two-wheel drive electric automobile, in addition to a rotation angle sensor mounted on a motor unit, a rotation angle sensor is required for each driven wheel. Furthermore, the responsiveness of an engine and a brake is poor, so that rapid control can be impossible.

In the technique disclosed in Patent Document 2, the angular acceleration can be directly measured, but an acceleration sensor is expensive, so that the cost increases. In the case where the angular acceleration is indirectly obtained with a calculation on the basis of a rotation speed, the calculated angular acceleration is not accurate, so that the practicability decreases.

An object of the present invention is to provide a slip control device for an electric automobile which slip control device is able to accurately determine occurrence of a slippage by using only a rotation angle sensor for motor rotation control and perform rapid control to eliminate the slippage.

Hereinafter, for convenience of easy understanding of the present invention, a description will be given with reference to the reference numerals in embodiments.

A slip control device 20 according to one aspect of the present invention is provided in an electric automobile 5 including at least one traction electric motor unit 3, for slip-controlling the electric automobile, the device including:

a threshold calculation module 21 configured to calculate a normal angular acceleration of the motor unit 3 as a function of a manipulation amount of an accelerator 4 to calculate a threshold for slip determination, on the basis of the calculated normal angular acceleration;

an angular acceleration calculation module 22 configured to calculate an angular acceleration of the motor unit 3 on the basis of a detection value from a rotation speed detection device that detects a rotation speed of the motor unit 3;

a slip determination module 23 configured to determine whether a wheel 7 driven by the motor unit 3 has slipped; and a torque limiting module 25 configured to limit a torque developed by the motor unit 3, if the slip determination module 23 determines that the wheel 7 has slipped. As such, the torque limiting module 25 limits the torque at the time of the occurrence of the slippage.

The slip determination module 23 includes:

an angular acceleration comparison section 26 configured to compare the angular acceleration calculated by the angular acceleration calculation module 22 to the threshold to determine whether the angular acceleration exceeds the threshold or is equal to or higher than the threshold;

a counting section 27 configured to count a number of times the angular acceleration comparison section 26 consecutively determines that the angular acceleration is equal to or higher than the threshold or exceeds the threshold; and a slip determination section 28 configured to determine that a slippage has occurred, if the number of times counted by the counting section 27 has reached a set value.

Preferably, the rotation speed detection device includes a rotation angle sensor 3a that measures a rotation angle of the motor unit 3, and differentiates the rotation angle measured by the rotation angle sensor 3a, to detect the rotation speed.

According to this configuration, as a sensor, only the rotation angle sensor 3a configured to detect the rotation angle of the motor unit 3 is used, and the angular acceleration is obtained through calculation. Thus, a sensor other than the rotation angle sensor 3a for the drive wheel is not required, and an expensive acceleration sensor is not required, so that cost increase is suppressed. Since the angular acceleration is obtained from the rotation angle sensor 3*a*, the detected angular acceleration may not be accurate enough. Nevertheless, if the number of consecutive times of being equal to or higher than the threshold or the number of consecutive times of exceeding the threshold has reached the set value, it is determined that a slippage has occurred, so that the determination of slip occurrence can be determined errorlessly. In addition, since the torque of the motor unit 3 is controlled to eliminate a slippage, the responsiveness is good and rapid control is enabled, unlike the case of controlling an engine or a brake to eliminate a slippage.

The torque limiting module 25 may include a torque zeroing section 29 configured to make the torque developed by the motor unit 3, to be zero if the slip determination module 23 determines that the slippage has occurred.

The torque of the motor unit 3 for the wheel 7 at which the slippage has occurred is made to be zero, whereby the occurring slippage is assuredly eliminated.

The torque limiting module 25 may include a torque recovery section 31 configured to: determine whether the rotation speed of the motor unit 3 has decreased to a slip determination reference rotation speed set on the basis of a rotation speed before it is determined that the slippage has occurred; and gradually increase and recover the torque developed by the motor unit 3, if determining that the rotation speed of the motor unit 3 has decreased to the slip determination reference rotation speed.

If the torque was rapidly restored after the torque of the motor unit 3 which drives the drive wheel at which the slippage has occurred is made to be zero, a feeling of acceleration would be provided to a person in the vehicle 5 such as a driver due to rapid acceleration of the vehicle 5. In contrast, when the torque recovery section 31 gradually recovers the torque as described above, comfortable running performance can be maintained without providing a feeling of acceleration or deceleration to the person in the vehicle.

A torque gradual reduction module 24 configured to gradually reduce the torque developed by the motor unit 3, as the number of times counted by the counting section 27 increases, before the slip determination section 28 determines that the slippage has occurred, may be provided.

As described above, in this configuration, the determination as to whether the angular acceleration is equal to or higher than the threshold or exceeds the threshold is performed the set number of times, and then the determination of slip occurrence is performed. The determination for the set number of times is performed in a very short time, but the vehicle 5 slightly advances during this time. Therefore, since the torque developed by the motor unit 3 is gradually reduced as the number of times increases as described above even when the determination of slip occurrence has not been completed, measures for slip elimination can be taken early. In addition, when the torque of the motor unit 3 is controlled to be zero if it is determined that the slippage has occurred, since the torque is reduced prior to this control, a rapid decrease in speed occurring in the vehicle 5 is avoided, so that comfortable running performance can be maintained without providing a feeling of acceleration or deceleration to the person in the vehicle 5. Since the torque is reduced before reaching the set number of times, the torque is reduced in some cases even if actually no slippage has occurred. However, since the torque is gradually reduced as the count value increases, a decrease in running speed caused by reducing the torque when no slippage has occurred is gentle. Meanwhile, rapid control to eliminate the slippage can be performed. That is, if the degree of uncertainty in a possibility of a slippage is high due to a low count value, the torque is very slightly reduced, and the degree of torque reduction is increased as the degree of certainty in the possibility of a slippage increases due to an increase in the count value, so that it is possible to achieve both prompt action to avoid a slippage and prompt action to avoid wasted torque reduction.

An electric automobile according to one aspect of the present invention includes the slip control device 20 and the at least one traction electric motor unit including a plurality of the motor units 3. The slip determination module 23 and the torque limiting module 25 are provided for each of the motor units 3.

The torque limiting module 25 may include a reference rotation speed setting section 30 configured to set the slip determination reference rotation speed, the plurality of the motor units 3 may include a pair of motor units 3 configured to drive left and right wheels 7, respectively, if it is not determined that the wheel 7 laterally opposite to the wheel 7 determined as having slipped has slipped, the reference rotation speed setting section 30 may compare a current rotation speed of the opposite wheel 7 to a rotation speed which corresponds to the wheel 7 determined as having slipped and is a rotation speed at time of angular acceleration comparison when the number of times counted by the counting section 27 is 1, and may set a lower rotation speed as the reference rotation speed, and if it is determined that the wheel 7 laterally opposite to the wheel 7 determined as having slipped has slipped, the reference rotation speed setting section 30 may set, as the reference rotation speed, the rotation speed which corresponds to the wheel 7 determined earlier as having slipped and is the rotation speed at the time of angular acceleration comparison when the count by the counting section 27 is 1.

Since the reference rotation speed is set as described above, grip of the wheel 7, which means elimination of a slippage, can be determined as appropriate. At the time of angular acceleration comparison when the number of times counted by the counting section 27 is 1, even if the angular acceleration is high to some extent, the rotation speed has not increased yet. Therefore, this rotation speed can be considered to have a magnitude suitable for the reference rotation speed.

Each motor unit 3 may form an in-wheel motor device 11.

In the in-wheel motor device 11, each wheel 7 is individually driven by the motor unit, and thus is greatly affected by a slippage. Therefore, the effect by the slip control is more effectively exerted.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
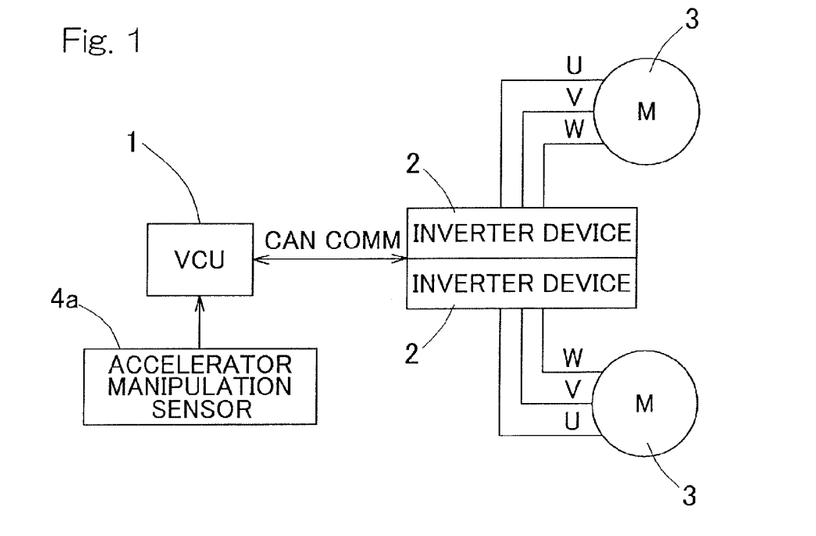
FIG. 1 is a block diagram of a schematic configuration of an electric automobile drive system including slip control devices, for an electric automobile, according to an embodiment of the present invention.

An embodiment of the present invention will be described with reference to the drawings. FIG. 1 shows an electric automobile drive system including slip control devices according to the embodiment. The electric automobile drive system includes a VCU (vehicle control unit) 1 and inverter devices 2. The VCU 1 is a computer type electric control unit which performs integrated control and cooperative control of the entire vehicle, and is also referred to as "ECU". The inverter devices 2 are configured to apply driving currents to a plurality of traction motor units 3, respectively, in accordance with a drive command sent from the VCU 1. The VCU 1 and the inverter devices 2 are connected to each other so as to enable signal transmission therebetween via communication line such as CAN (control area network) communication. FIG. 1 shows an example of application to a vehicle including left and right two wheels which are driven by the motor units 3, respectively. In this example, each motor unit 3 includes an induction motor unit or a synchronous motor unit driven by three-phase alternating current. A drive command which indicates an accelerator manipulation amount and is outputted from an accelerator manipulation sensor 4a is inputted to the VCU 1, and distributed from the VCU 1 to the inverter devices 2 for the respective motor units 3.

Figure 2:
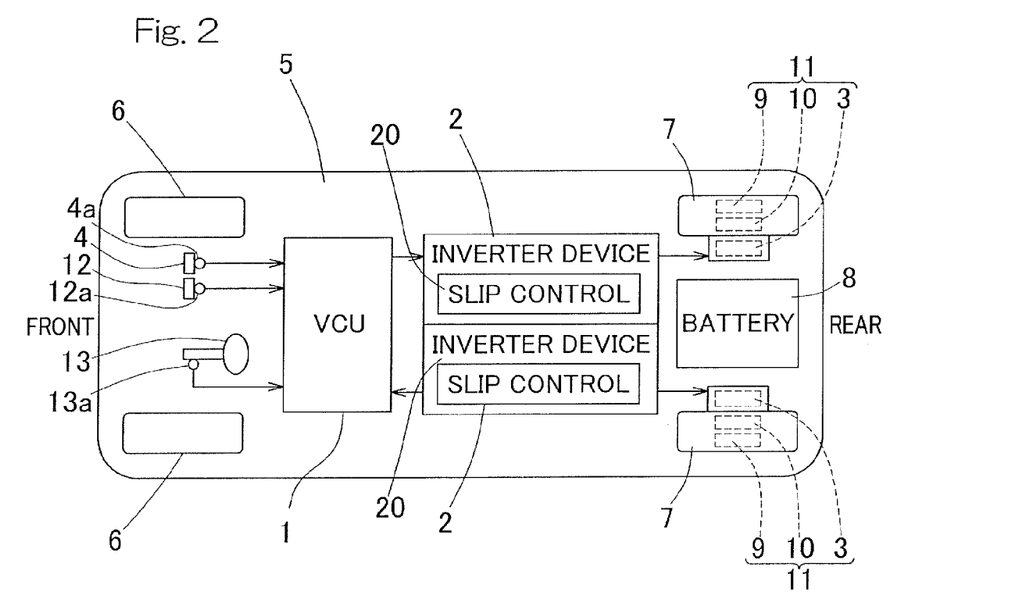
FIG. 2 is a block diagram showing an example of the electric automobile drive system shown in FIG. 1.

FIG. 2 shows an example of the electric automobile drive system. The electric automobile 5 includes a vehicle body and four wheels composed of front wheels 6 and rear wheels 7. The left and right rear wheels 7 function as drive wheels which are driven by the motor units 3, respectively. In this example, each motor unit 3, together with a wheel bearing 9 and a reducer 10, forms an in-wheel motor drive device 11. The reducer 10 reduces the speed of rotation output from the motor unit 3 and transmits the rotation output to a rotating ring (not shown) of the wheel bearing 9.

The VCU 1 receives a signal indicating an accelerator manipulation amount, a signal indicating a brake manipulation amount, and a signal indicating a steering wheel manipulation amount, from the accelerator manipulation sensor 4a for an accelerator 4, a brake manipulation sensor 12a for a brake 12, and a steering sensor 13a for a steering wheel 13, respectively. In accordance with the signal indicating the accelerator manipulation amount from the accelerator manipulation sensor 4a, the VCU 1 generates torque command values to be distributed to the respective left and right motor units 3, in consideration of the signal indicating the brake manipulation amount and the signal indicating the steering wheel manipulation amount, and sends the torque command values to the respective inverter devices 2. Each inverter device 2 converts a DC power from a battery 8 into an AC motor driving current to control the motor driving current in accordance with the torque command.

The inverter devices 2 include slip control devices 20, for the electric automobile, according to the embodiment, respectively. Alternatively, the slip control devices 20 may be provided in the VCU 1.

Figure 3:
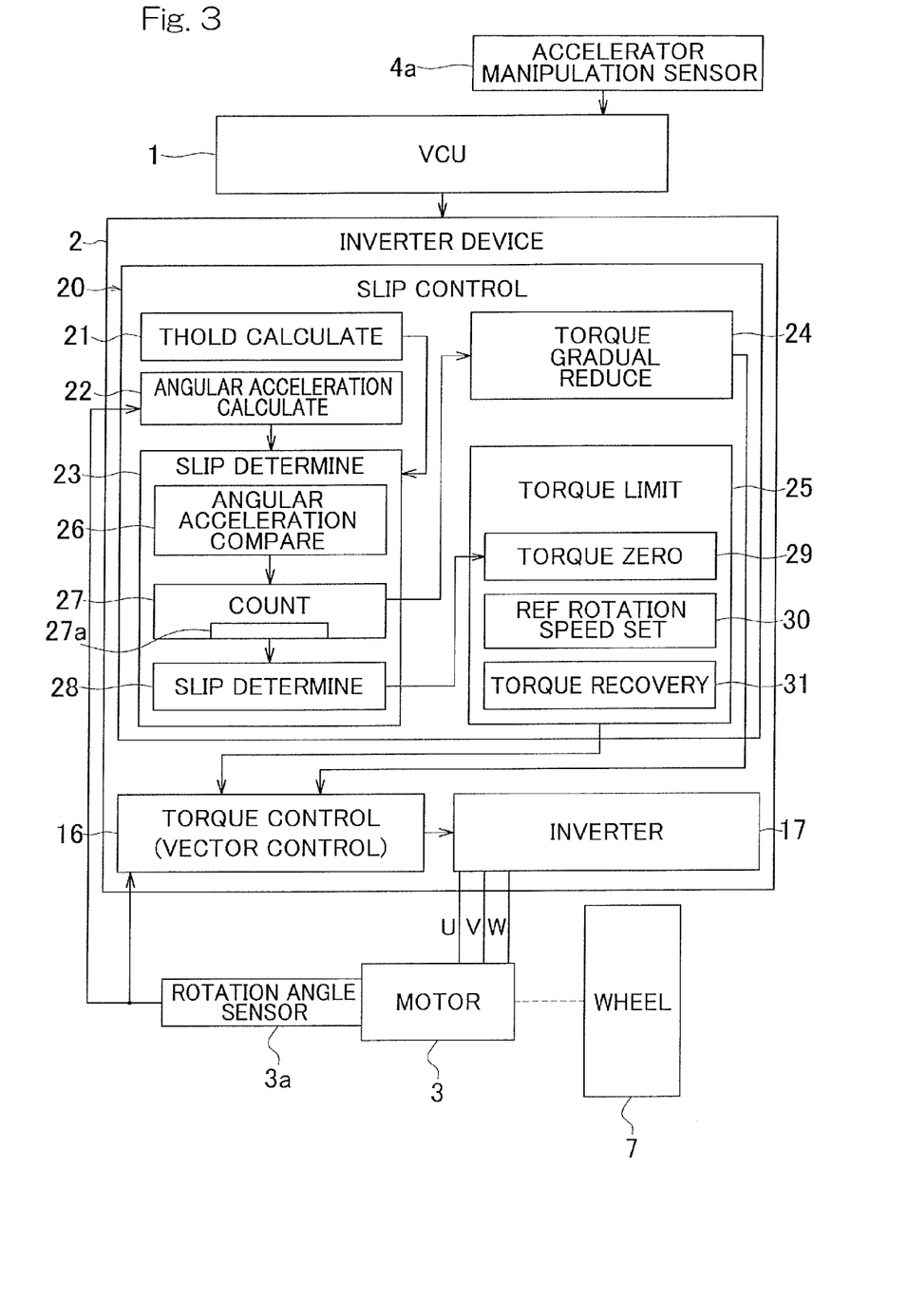
FIG. 3 is a block diagram of a schematic configuration of the slip control device of the electric automobile drive system shown in FIG. 1.

FIG. 3 is a functional block diagram showing the configuration of the inverter device 2, in particular, the configuration of the slip control device 20. The inverter device 2 includes: an inverter 17 which converts a DC power from a battery (not shown) into a three-phase AC power; and a torque control module 16 which converts the torque command sent from the VCU 1, into a current command and controls current output of the inverter 17. The torque control module 16 may perform control such as vector control which achieves efficiency improvement in accordance with a rotation angle of a rotor (not shown) of the motor unit 3. For this control, a rotation angle detection value from a rotation angle sensor 3a provided to the motor unit 3 is inputted to the torque control module 16.

The torque control module 16 is formed on a light current circuit segment including an electronic circuit of the inverter device 2 such as a microcomputer. The slip control device 20 is also formed on the light current circuit segment.

Figure 4:
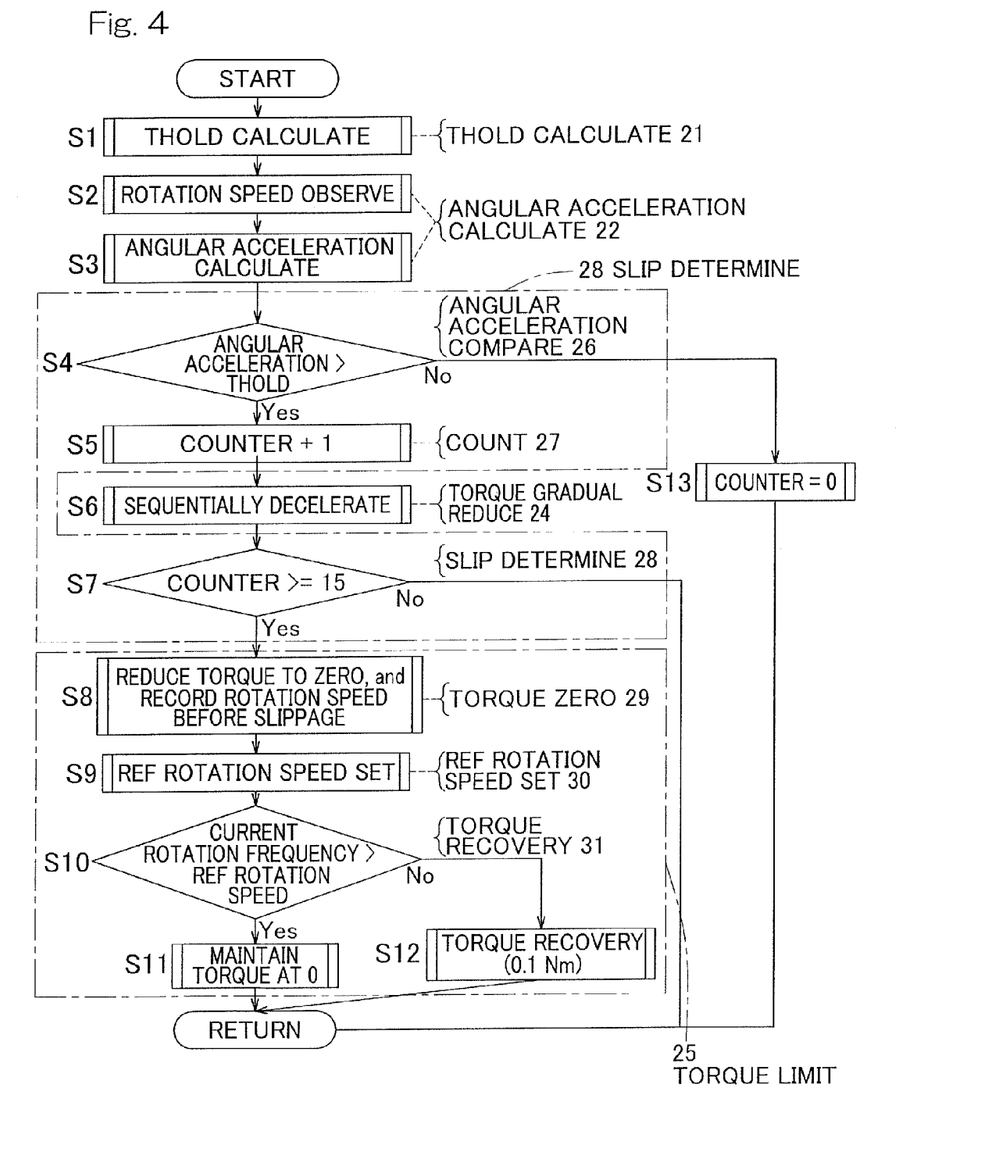
FIG. 4 is a flowchart showing a control operation of the slip control device shown in FIG. 1.

The slip control device 20 is configured to perform control shown in a flowchart of FIG. 4. As shown in FIG. 3, the slip control device 20 includes a threshold calculation module 21, an angular acceleration calculation module 22, a slip determination module 23, a torque gradual reduction module 24, and a torque limiting module 25. The slip determination module 23 includes an angular acceleration comparison section 26, a counting section 27, and a slip determination section 28. The torque gradual reduction module 24 is configured to gradually reduce a torque prior to determination as to occurrence of a slippage. The torque limiting module 25 is configured to limit the torque at the time of a slippage and includes a torque zeroing section 29, a reference rotation speed setting section 30, and a torque recovery section 31. The functions of the respective modules and sections will be described in detail with reference to the flowchart of FIG. 4.

As shown in FIG. 4, first, a threshold for slip determination is calculated (step S1). In the threshold calculation step (S1), a normal angular acceleration of the motor unit 3 as a function of a manipulation amount of the accelerator 4 outputted from the accelerator manipulation sensor 4a, that is, an angular acceleration which should be exhibited by the motor unit 3 in a normal situation in accordance with the manipulation amount of the accelerator 4, is calculated, and the calculated normal angular acceleration is set as the threshold. A value obtained by multiplying the calculated angular acceleration by an appropriately set coefficient or the like may be set as the threshold.

An example of the threshold will be described. An acceleration a which is given to the vehicle as a result of manipulation of the accelerator is calculated by the following formula.

[Math. 1]

$$\alpha = \frac{T}{m*r} \quad \text{Formula 1}$$

The angular acceleration is:

$$\dot{\omega} = \frac{T}{m*r^2} \quad \text{Formula 2}$$

Where T denotes the sum of motor torques of all the motor units 3 (two in the illustrated example) included in the vehicle 5, m denotes the mass of the vehicle 5, and r denotes the radius of a tire of the drive wheel 7.

The sum T of the motor torques depends on the manipulation amount of the accelerator 4 (FIG. 2). Thus, an angular acceleration $d\omega/dt$ $(=\dot{\omega})$ is obtained from the above formulas 1 and 2 on the basis of the accelerator manipulation amount outputted from the accelerator manipulation sensor 4a. The obtained angular acceleration $d\omega/dt$ is set as the threshold. That is, the angular acceleration $d\omega/dt$ in the above formula 2 is an angular acceleration which should be exhibited by the motor unit 3 when no slippage has occurred.

The process in step S1 is performed by the threshold calculation module 21.

In a rotation speed observation step (S2), a rotation angle of the motor unit 3 is measured by the rotation angle sensor 3a. In an acceleration calculation step (S3), the measured rotation angle is differentiated twice to obtain an angular acceleration. The processes in steps S2 and S3 are performed by the angular acceleration calculation module 22.

Since only the rotation angle sensor 3 is used and an acceleration sensor which is expensive is not used, the cost can be reduced. However, the value obtained by performing differentiation twice as described above is varied greatly and cannot be used as it is. Thus, slip determination is performed by performing determination a plurality of consecutive times as described below.

In a determination step (S4) with respect to the threshold for angular acceleration, it is determined whether the angular acceleration calculated in step S3 exceeds the threshold obtained in step S1. It may be determined whether the angular acceleration is equal to or higher than the threshold. If the angular acceleration does not exceed the threshold, it is determined that no slippage has occurred, thus a counter 27a (FIG. 3) is reset to zero, a return is made to step S1, and the process is restarted therefrom. At this time of restart, a count value (the number of times) is zero.

If the angular acceleration exceeds the threshold in step S4, it is determined that there is a possibility that the angular acceleration has increased due to a slippage, and thus the counter 27a is incremented for the next slip determination (S5).

It is determined whether the count value of the counter 27a has reached a set number of times N (the set number of times N=15 in the illustrated example). If the count value has not reached the set number of times, a return is made to step S1, and the process is restarted therefrom. At this time of restart, the counter 27a has not been reset, and thus the process is restarted while the count value that has been updated last time is maintained. A sequential deceleration step (S6) will be described later.

As described above, the determination as to whether the angular acceleration exceeds the threshold (S4) and the determination as to whether the count value has reached the set number of times (S7) if the angular acceleration exceeds the threshold are repeated. If the angular acceleration does not exceed the threshold, the counter 27a is reset (S13) as described above. Thus, in the determination as to whether the count value has reached the set number of times (S7), the number of times of consecutively exceeding the threshold is counted. If the count value has reached the set number of times N, it is determined that a slippage has occurred, and the process proceeds to step S8 for slip elimination.

As described above, if the angular acceleration has consecutively exceeded the threshold the set number of times N, it is determined that a slippage has occurred. Thus, even when occurrence of a slippage is determined on the basis of the angular acceleration obtained by differentiating twice the value from the rotation angle sensor 3, occurrence of a slippage can be determined errorlessly.

The determination step (S4) with respect to the threshold for angular acceleration is performed by the angular acceleration comparison section 26. The counter addition step (S5) and the counter resetting step (S13) are performed by the counting section 27. The determination step (S7) as to whether the count value has reached the set number of times is performed by the slip determination section 28. The slip determination module 28 includes the angular acceleration comparison section 26, the counting section 27, and the slip determination section 28.

If it is determined that a slippage has occurred and the process proceeds to step S8, a command to make a torque developed by the motor unit 3 to be zero is sent to the torque control module 16 in order to eliminate the slippage. The process of making the torque to be zero in step S8 is performed by the torque zeroing section 29. Since the torque of the motor unit for the wheel at which the slippage has occurred is made to be zero, the occurring slippage is assuredly eliminated. In addition, since the torque of the motor unit 3 is controlled to eliminate the slippage, the responsiveness is good and rapid control is enabled, unlike the case of controlling an engine or a brake to eliminate a slippage.

In step S8, in addition to the process of making the torque to be zero, in order to obtain a reference value for torque recovery determination, the rotation speed at the time of angular acceleration comparison (S4) when the count value which has reached the set number of times N was 1 is recorded in a predetermined storage area. The rotation speed in the case of exceeding the threshold at the time of angular acceleration comparison (S4) is stored at all times, and in step S8, the rotation speed at the initial time of the consecutive N times is recorded in a predetermined storage area for reference rotation speed setting.

Thereafter, in a reference rotation speed setting step S9, a reference rotation speed for torque recovery determination is set. In FIG. 4, "reference rotation frequency" is shown, but, "rotation frequency" is synonymous with "rotation speed" in the specification.

The reference rotation speed is set as follows.

If a single wheel has slipped, that is, if it is not determined that the wheel 7 laterally opposite to the wheel 7 determined as having slipped has slipped, the current rotation speed of the opposite wheel 7 is compared to the rotation speed of the wheel 7 determined as having slipped which rotation speed is the recorded rotation speed at the time of angular acceleration comparison when the count value is 1, and then the lower rotation speed is set as the reference rotation speed.

If it is determined that both wheels have slipped, that is, if it is also determined that the wheel 7 laterally opposite to the wheel 7 determined as having slipped has slipped, the rotation speed of the wheel 7 determined earlier as having slipped which rotation speed is the rotation speed at the time of angular acceleration comparison when the count value counted by the counting section 27 is 1 is set as the reference rotation speed. The process in the reference rotation speed setting step S9 is performed by the reference rotation speed setting section 30.

After the reference rotation speed is set as described above, the current rotation speed of the wheel 7 obtained on the basis of a detection value from the rotation angle sensor 3a (FIG. 3) is compared to the reference rotation speed (S10). If the current rotation speed is higher than the reference rotation speed, it is determined that the slippage has not been eliminated yet. That is, it is determined that the wheel 7 has not gripped. If the current rotation speed is equal to or lower than the reference rotation speed, it is determined that there has been a recovery from the slippage, that is, the wheel 7 has gripped. In short, if the current rotation speed has decreased to a rotation speed that is the rotation speed prior to the slippage, it is determined that the wheel 7 has gripped.

If it is determined that the slippage has not been eliminated yet, the torque is maintained at zero (S11), and a return is made. The process may return to the step immediately before or after the reference rotation speed setting step S9. If it is determined in the comparison step S10 that the slippage has been eliminated, the torque is gradually recovered.

For example, the torque is increased by a slight set amount (e.g., 0.1 Nm) to be recovered (S12), and then a return is made or the process returns to the step immediately before or after the reference rotation speed setting step S9.

In the same manner, the current rotation speed is compared to the reference rotation speed again (S10), and if it is determined that the slippage has been eliminated, the torque is increased again by the slight set amount to be recovered (S12). The torque recovery section 31 performs the determination step S10 and the step S12 of recovering the torque by the slight set amount.

If the torque was rapidly restored after the torque of the motor unit 3 at which the slippage has occurred is made to be zero, a feeling of acceleration or an acceleration sensation would be provided to a person in the vehicle such as a driver due to rapid acceleration of the vehicle. In contrast, when the torque recovery section 31 gradually increases and recovers the torque as described above, comfortable running performance can be maintained without providing a feeling of acceleration or deceleration to the person in the vehicle.

The torque limiting module 25 includes the torque zeroing section 29, the reference rotation speed setting section 30 and the torque recovery section 31.

Next, the sequential deceleration step S6 will be described. In the step S6 the torque developed by the motor unit 3 is gradually reduced as the count value counted by the counting section 27 increases, at a stage where it is determined that the angular acceleration exceeds the threshold at least once, before it is determined in the slip determination step S7 that the count value exceeds the set number of times N and a slippage has occurred, that is, at a stage where tendency toward a slippage is detected. That is, a torque value to be instructed to the torque control module 16 is reduced as compared to a torque value which is normally instructed in accordance with the accelerator manipulation amount, thereby decreasing a torque value for driving the motor unit 3.

Figure 5:
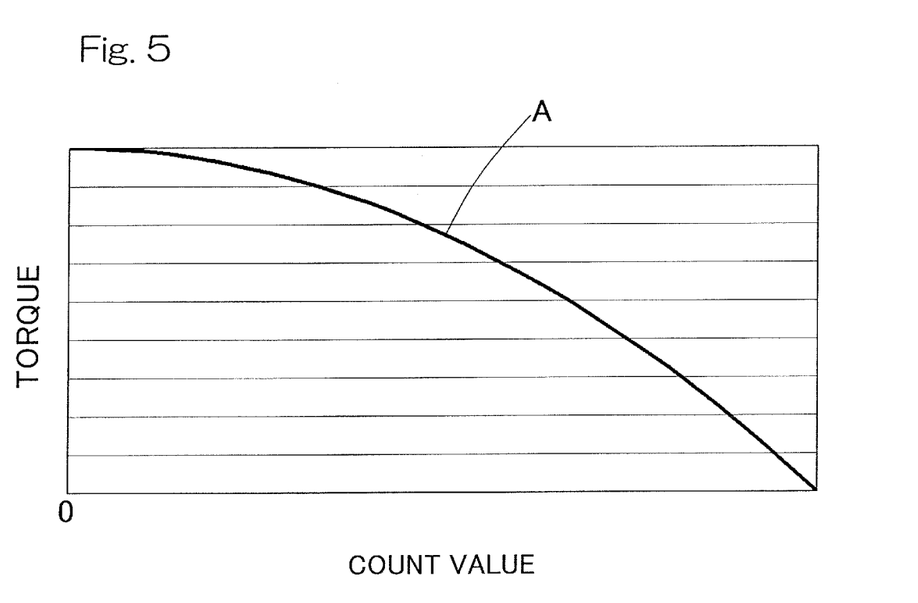
FIG. 5 is a graph showing an example of a curve for reducing a torque by a torque gradual reduction module of the slip control device.

For example, as shown in FIG. 5, according to a curve A represented by a nonlinear equation, the torque value for driving the motor unit 3 is reduced with respect to the torque value depending on the accelerator manipulation amount. Specifically, when the count value is in a low value, the degree of reduction is low, and as the count value increases, the degree of reduction is increased, and the rate of change in the torque is increased in accordance with the magnitude of the count value. The curve A, for example, matches a quadric curve (a curve of second order). The curve A may match a cubic curve (a curve of third order) or more order, but a quadric curve is preferable when the advantages of easiness of calculation and an obtained effect are compared.

The process in the sequential deceleration step S6 is performed by the torque gradual reduction module 24.

As described above, in the embodiment, the determination as to whether the angular acceleration is equal to or higher than the threshold or exceeds the threshold (S4) is performed the set number of times, and then a slippage is determined (S7). The determination for the set number of times is performed in a very short time, but the vehicle slightly advances during this time. However, since the torque developed by the motor unit 3 is gradually reduced as the count value increases as described above even when the slip determination has not been completed, measures for slip elimination can be taken early. In addition, when the torque of the motor unit 3 is controlled to be zero (S8) due to the determination of the slippage, since the torque has been reduced prior to this control, a rapid decrease in speed occurring in the vehicle is avoided, so that comfortable running performance can be maintained without providing a feeling of acceleration or deceleration. Since the torque is reduced before reaching the set number of times, the torque is reduced in some cases even if actually no slippage has occurred. However, since the torque is gradually reduced as the count value increases, a decrease in running speed caused by reducing the torque when no slip has occurred is gentle. Meanwhile, rapid control to eliminate a slippage can be performed. That is, if the degree of uncertainty in a possibility of a slippage is high due to a low count value, the torque is very slightly reduced, and the degree of torque reduction is increased as the degree of certainty in the possibility of a slippage increases due to an increase in the count value, so that it is possible to achieve both prompt action to avoid a slippage and prompt action to avoid wasted torque reduction.

The slip control devices according to the embodiment are provided to the vehicle including the in-wheel motor devices 11. In the in-wheel motor device 11, each wheel 7 is individually driven by the motor unit, and thus is greatly affected by a slippage. Therefore, the effect by the slip control with each slip control device according to the embodiment is more effectively exerted.

REFERENCE NUMERALS

3 . . . motor unit
3a . . . rotation angle sensor
4 . . . accelerator
5 . . . vehicle
6, 7 . . . wheel
20 . . . slip control device
21 . . . threshold calculation module
22 . . . angular acceleration calculation module
23 . . . slip determination module
25 . . . torque limiting module
26 . . . angular acceleration comparison section
27 . . . counting section
28 . . . slip determination section

What is claimed is:

1. A slip control device for slip-controlling an electric automobile having at least one traction electric motor unit, the slip control device comprising:
   a threshold calculation module configured to calculate a normal angular acceleration of the motor unit as a function of a manipulation amount of an accelerator to calculate a threshold for slip determination, on the basis of the calculated normal angular acceleration;
   an angular acceleration calculation module configured to calculate an angular acceleration of the motor unit on the basis of a detection value from a rotation speed detection device that detects a rotation speed of the motor unit;

a slip determination module configured to determine whether a wheel driven by the motor unit has slipped, the slip determination module including an angular acceleration comparison section configured to compare the angular acceleration calculated by the angular acceleration calculation module to the threshold to determine whether the angular acceleration exceeds the threshold or is equal to or higher than the threshold;

a counting section configured to count a number of times the angular acceleration comparison section consecutively determines that the angular acceleration is equal to or higher than the threshold or exceeds the threshold; and a slip determination section configured to determine that a slippage has occurred, if the number of times counted by the counting section has reached a set value; and a torque limiting module configured to limit a torque developed by the motor unit, if the slip determination module determines that the slippage has occurred.

2. The slip control device as claimed in claim 1, wherein the rotation speed detection device includes a rotation angle sensor that measures a rotation angle of the motor unit, and differentiates the rotation angle measured by the rotation angle sensor, to detect the rotation speed.

3. The slip control device as claimed in claim 1, wherein the torque limiting module includes a torque zeroing section configured to make the torque developed by the motor unit, to be zero if the slip determination module determines that the slippage has occurred.

4. The slip control device as claimed in claim 3, wherein the torque limiting module includes a torque recovery section configured to:

determine whether the rotation speed of the motor unit has decreased to a slip determination reference rotation speed set on the basis of a rotation speed before it is determined that the slippage has occurred; and gradually increase and recover the torque developed by the motor unit, if determining that the rotation speed of the motor unit has decreased to the slip determination reference rotation speed.

5. The slip control device as claimed in claim 1, further comprising a torque gradual reduction module configured to gradually reduce the torque developed by the motor unit, as the number of times counted by the counting section increases, before the slip determination section determines that the slippage has occurred.

6. An electric automobile having at least one traction electric motor unit, comprising:

the slip control device as claimed in claim 1; and the at least one traction electric motor unit includes a plurality of motor units, wherein the slip determination module and the torque limiting module are provided for each of the plurality of motor units.

7. An electric automobile having at least one traction electric motor unit, comprising:

the slip control device as claimed in claim 4; and the at least one traction electric motor unit includes a plurality of motor units, wherein the slip determination module and the torque limiting module are provided for each of the plurality of motor units, the torque limiting module includes a reference rotation speed setting section configured to set the slip determination reference rotation speed, the plurality of the motor units include a pair of motor units configured to drive left and right wheels, respectively, if it is not determined that the wheel laterally opposite to the wheel determined as having slipped has slipped, the reference rotation speed setting section compares a current rotation speed of the opposite wheel to a rotation speed which corresponds to the wheel determined as having slipped and is a rotation speed at time of angular acceleration comparison when the number of times counted by the counting section is 1, and sets a lower rotation speed as the slip determination reference rotation speed, and if it is determined that the wheel laterally opposite to the wheel determined as having slipped has slipped, the reference rotation speed setting section sets, as the reference rotation speed, the rotation speed which corresponds to the wheel determined earlier as having slipped and is the rotation speed at the time of angular acceleration comparison when the number of times counted by the counting section is 1.

8. The electric automobile as claimed in claim 6, wherein each of the plurality of motor units forms an in-wheel motor device.

* * * * *